United States Patent [19]

Bierman et al.

[11] Patent Number: 4,554,004
[45] Date of Patent: Nov. 19, 1985

[54] PROCESS FOR GRANULATION OF FERTILIZER MATERIALS

[75] Inventors: Laurence W. Bierman; Charles R. Edinborough; David K. Johnson, all of Pocatello, Id.

[73] Assignee: J. R. Simplot Company, Boise, Id.

[21] Appl. No.: 543,488

[22] Filed: Oct. 19, 1983

[51] Int. Cl.[4] .................... B02C 19/12; C05B 15/00
[52] U.S. Cl. ........................................ 71/29; 71/64.04; 71/64.07; 241/21; 241/23
[58] Field of Search .......... 264/117; 23/313 R, 313 P; 241/16, 21, 23, 22, 101 D; 71/28, 29, 36, 41, 49, 71/59, 61, 63, 64.04, 64.05, 64.13, 64.07, 23

[56] References Cited

U.S. PATENT DOCUMENTS

| T102,201 | 9/1982 | Harrison . |
| T900,018 | 7/1972 | Lee et al. . |
| 3,539,329 | 11/1970 | Wilson . |
| 3,725,029 | 4/1973 | Blackmore . |
| 3,738,821 | 6/1973 | Barber . |
| 4,134,750 | 1/1979 | Norton et al. . |
| 4,175,943 | 11/1979 | Jordaan et al. . |
| 4,277,253 | 7/1981 | Walter et al. . |
| 4,305,748 | 12/1981 | Bechthold et al. . |

*Primary Examiner*—Mark Rosenbaum
*Attorney, Agent, or Firm*—Fulwider Patton Rieber Lee & Utecht

[57] ABSTRACT

A process for preparing granulated fertilizer materials, wherein urea phosphate is used as a granulating agent to assist in the agglomeration of finely divided solid particles into relatively uniformly sized granules. Urea phosphate, prepared by dissolving urea in phosphoric acid, is coated onto finely divided particles of fertilizer materials, and granulation is accomplished at a temperature within the thermoplastic range of the urea phosphate, wherein the urea phosphate plasticizes and induces adherence of the fine particles into relatively uniformly sized granules. Optionally, ammonia gas, clay, or micro nutrients may be added after granulation.

14 Claims, 1 Drawing Figure

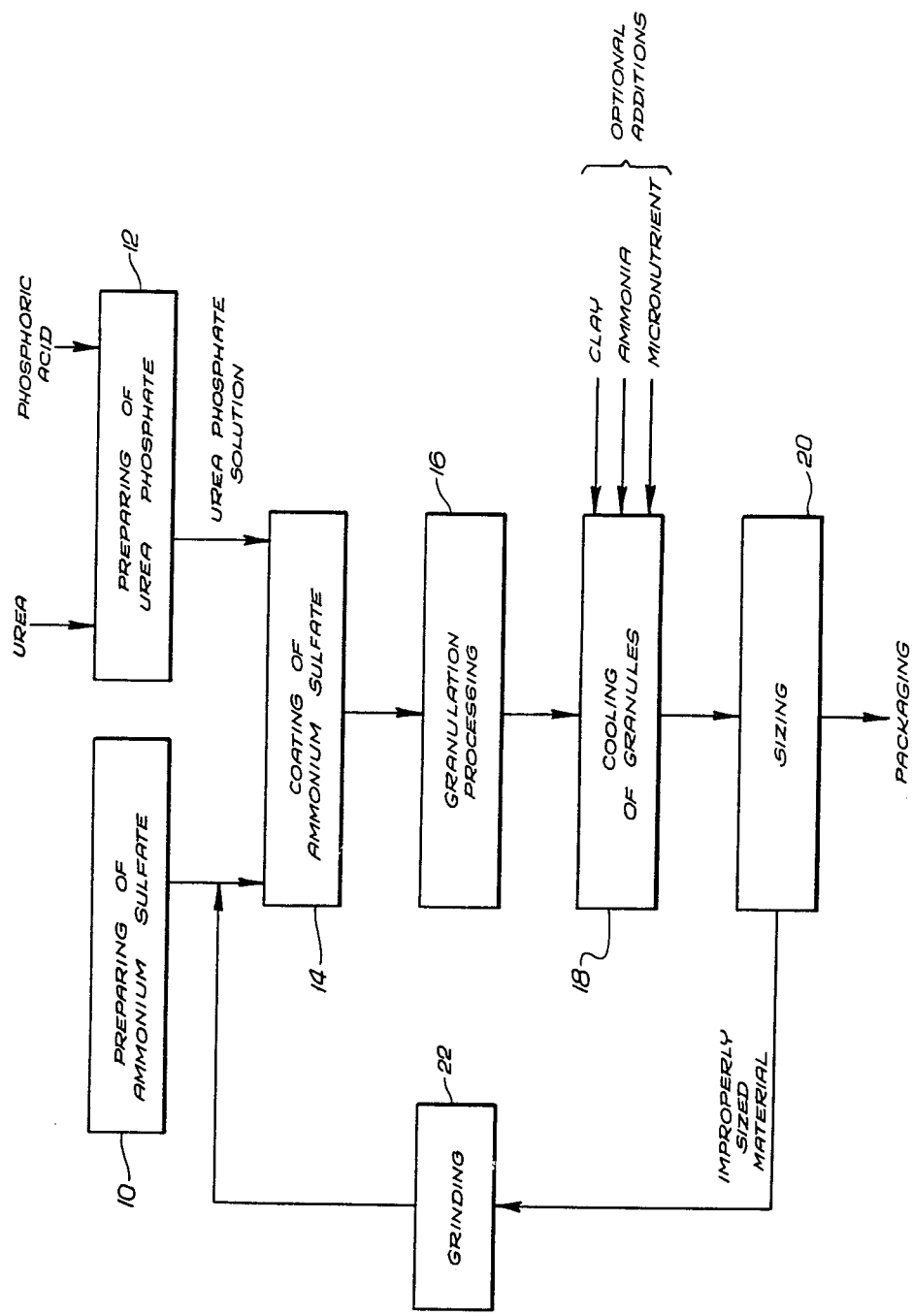

PROCESS FOR GRANULATION OF FERTILIZER MATERIALS

BACKGROUND OF THE INVENTION

The present invention relates generally to the mechanical processing of chemical products, and, more particularly, to a process for preparing uniformly sized granules of fertilizer materials which do not go through a thermoplastic temperature range in normal granulation processing.

Ammonium sulfate is a commonly available industrial and agricultural chemical typically prepared by reacting ammonia and sulfuric acid in a crystallizer. Unless the crystallization conditions are closely controlled, the ammonium sulfate may be formed as very fine crystals which do not readily blend and distribute evenly with other fertilizer ingredients, and cannot be readily distributed with spreaders. This fine crystalline form presents a problem to the fertilizer industry. Ammonium sulfate is often desirably distributed in a mixture with other fertilizer chemicals, and the ammonium sulfate in fine crystalline form does not spread evenly in such a mixture.

Several approaches have been proposed to overcome this problem, including the granulation of ammonium sulfate with the addition of a chemical serving as a granulation aid such as ammonium phosphate to induce adherence of the fine crystals. However, the commonly available granulation aids have been found to be difficult to use to produce a consistently sized product, in that large quantities must be added to essentially encapsulate the ammonium sulfate within the aid, as there is little tendency for the aid to stick to the sulfate particle. Such consistent sizing of the final granules is highly desirable, inasmuch as recycling of undersized or oversized materials in the preparation plant is minimized, and the ability to mix the ammonium sulfate granules with other fertilizer ingredients is improved.

Although ammonium sulfate has been used as a specific example, this particular fertilizer material is representative of a class of fertilizer materials which exhibit comparable properties during preparation. Such fertilizer materials do not themselves experience a thermoplastic zone at elevated temperatures during their processing. Consequently, the small crystals or particles of such fertilizer materials cannot be made to adhere to each other naturally to form larger granules during processing, unless a granulation aid is added. Examples of such fertilizer materials include potassium sulfate, gypsum, lime and limestone, iron salts such as sulfates, magnesium sulfate and carbonates, sulfur, various metal chelates, and combinations thereof.

Accordingly, there has been a continuing need for a process to prepare a commercially usable form of ammonium sulfate, and similar materials which do not naturally agglomerate during processing. Preferably, the process would result in uniformly sized granules, whose size may be controlled through adjustment of process parameters. The present invention fulfills this need, and further provides related advantages.

SUMMARY OF THE INVENTION

The present invention resides in an improved process for preparing relatively uniformly sized granules of fertilizer materials, wherein urea phosphate is used as a granulation aid to promote adherence of fine particles resulting from the basic preparation process. The granulation process employing urea phosphate as a granulation aid need not be subjected to excessively close process controls, and the processing allows the addition of ingredients such as micro nutrient compounds to the granules. Further, the granules produced are of relatively uniform size, and this final product size can be adjusted by varying the ratio of the urea phosphate addition to the fertilizer crystals.

In accordance with the invention, urea phosphate is added to and coated upon fine particles of fertilizer materials such as ammonium sulfate, and these coated particles are then agglomerated by adhering individual particles together in conventional granulation apparatus. Preferably, the urea phosphate is prepared by adding solid urea to warm phosphoric acid, and the solution is then coated onto fine fertilizer particles in a rolling drum or a mechanical mixer. The temperature of the coated fertilizer particles is adjusted to about 120° F. to allow the urea phosphate to produce a soft set and adhere the individual particles together. Granulation is then accomplished by conventional means such as a rotating drum granulator.

The granular product is slightly tacky to the touch, but is sufficiently firm to be handled by conventional processing equipment. Ammonia gas may be added to harden the granules, or a clay such as bentonite may be coated onto the granules to reduce their tackiness. Alternatively, the tackiness disappears after about 12–16 hours of air curing at ambient temperature. Secondary ingredients such as micro nutrients may also be added to the granules by coating the tacky surfaces.

Other salts and macro or micro nutrients upon which urea phosphate can form a coating may also be granulated by the process of the invention. These materials could include, for example, potassium sulfate, gypsum, lime and limestone, iron salts such as sulfates, magnesium sulfate and carbonates, sulfur, various metal chelates, and combinations thereof.

It will be appreciated from the foregoing that the present invention represents an advance in the industrial chemical field, and specifically in the field of fertilizer products. With the process of the invention, controllably, relatively uniformly sized granules of fertilizers such as ammonium sulfate may be prepared with the addition of a readily prepared granulation aid, urea phosphate. Other features and advantages of the present invention will become apparent from the following more detailed description, taken in conjunction with the accompanying drawing, which illustrates, by way of example, the principles of the invention.

BRIEF DESCRIPTION OF THE DRAWING

The FIGURE of the drawing is a schematic representation of a preferred process for preparing granules of ammonium sulfate.

DETAILED DESCRIPTION OF THE PREFERRED EMBODIMENT

As is shown in the FIGURE, a preferred embodiment of the present invention is concerned with a process for the preparation of granulated ammonium sulfate. Ammonium sulfate is provided to the process in the form of finely divided solid particles from an apparatus 10, which typically could be a crystallizer for reacting ammonia and sulfuric acid to produce fine crystals. Urea in solid form and phosphoric acid are also provided. Although the preferred embodiment of the invention is discussed in relation to the preparation of ammonium sulfate, it will be recognized that the invention is not so limited and may be applied to other fertilizer materials as discussed herein.

In accordance with the invention, urea phosphate is prepared and coated onto the finely divided solid particles of ammonium sulfate, and then the temperature of the coated particles is adjusted to the thermoplastic range of the urea phosphate, for granulation. In the granulation processing, the finely divided particles adhere together into a relatively uniformly sized granular product, having a slightly tacky surface.

Urea phosphate is prepared by dissolving or mixing solid urea into phosphoric acid in a dissolution tank 12. The phosphoric acid may be produced by any suitable technique, such as the wet process, and its concentration is not critical. However, an excessively dilute phosphoric acid contains a high percentage of water so that the resulting product will be difficult and expensive to dry, and an excessively concentrated phosphoric acid solution may cause the precipitation of urea phosphate after dissolution of the urea. A phosphoric acid concentration of 40-52% $P_2O_5$ has been found satisfactory, and 48-52% $P_2O_5$ is preferred. Dissolution of the urea into the phosphoric acid is accelerated by warming the acid, preferably to a temperature of from about 100° F. to about 160° F., and most preferably to about 140° F. The phosphoric acid should not be heated over about 220° F., inasmuch as such elevated temperatures result in hydrolysis and decomposition of the urea when added to the phosphoric acid.

The ratio of urea to phosphoric acid in the phosphoric acid solution is not critical, but the preferred urea range is from a stoichiometric quantity up to about a 35% excess of urea over stoichiometric quantity. Urea phosphate has a stoichiometric composition of $H_3PO_4(NH_2)_2CO$, and the stoichiometric quantity is stated in reference to this formula.

Use of urea above the stoichiometric quantity increases the nitrogen content of the final product and can be beneficial in promoting granulation. When urea is used above about 35% excess, however, excess precipitation may occur. Use of urea in an amount less than stoichiometric quantity increases the $P_2O_5$ content of the final granular product, and requires that excess acidity be neutralized with ammonia to produce a desirably dry and hard granular product.

The urea phosphate solution is coated onto the ammonium sulfate in a coating apparatus 14. Any type of coating apparatus may be used, including a continuous feed rolling drum such as a granulator, a coating drum, or a mechanical mixer such as a blunger, blender, or daisy mixer. The ammonium sulfate may be provided to the coating apparatus 14 as, for example, dried crystals from the apparatus 10 at either ambient or elevated temperature, or in a slightly moist form by a pipe reactor or similar device. The urea phosphate solution is applied to the crystals by spraying with a spray nozzle or other suitable technique. The ammonium sulfate should not be present at a temperature greater than about 190° F. as the urea in the urea phosphate solution may decompose. Preferably, the moisture in the ammonium sulfate is maintained at a low level, to minimize the energy required to dry the final granular product and to prevent urea thermal decomposition upon drying.

A ratio of from about 12% to about 15% by weight urea phosphate solution is preferably added to the ammonium sulfate at the coating apparatus 14, but this ratio is not critical and other quantities and solution strengths may be utilized if excess phosphate or excess urea is desired in the final product.

Granulation of the coated ammonium sulfate solid particles is accomplished in the granulating apparatus 16, which typically is a continuous-feed rolling drum. In the granulating apparatus 16, the temperature of the coated ammonium sulfate is adjusted to lie within the thermoplastic range of the urea phosphate coating material. It is believed that the thermoplastic properties of the urea phosphate promote agglomeration of the fine ammonium sulfate particles into relatively uniformly sized granules.

The effective temperature range wherein the thermoplastic properties of the urea phosphate may be utilized to assist in granulation is from about 100° F. to about 190° F. Preferably the granulating process in the apparatus 16 is accomplished at about 120° F. At a temperature of less than 100° F., urea phosphate is insufficiently plastic to promote adherence and agglomeration. Above 190° F., the urea may decompose. The preferred temperature of 120° F. is chosen to provide sufficient plasticity of the urea phosphate, but at the low end of the temperature range to reduce the energy requirements for heating.

The presence of the urea phosphate results in a surface of the ammonium sulfate particles that is tacky to the touch at the granulation temperature, and the tackiness may be retained even after cooling to ambient temperature. This condition of the granules is termed a "soft set."

The granulating apparatus 16 is preferably a rotating granulator such as a continuous flow rotating drum wherein the coated particles are tumbled constantly to induce contacting and adherence with other particles, until a desired size is reached. Coated particles are introduced at one end and progress through the drum, simultaneously being tumbled to contact particles together, whereby the crystals adhere into granules. If, for example, the ammonium sulfate fed to the coating apparatus 14 is at ambient temperature, then a conventional heated drum dryer may be used as the granulating apparatus 16. Precautions should be taken so that the coated ammonium sulfate and the granular products are never heated above about 190° F., to ensure that the urea is not decomposed.

As indicated above, the granules produced in the granulating apparatus 16 are slightly tacky to the touch but sufficiently firm to be handled in conventional conveying equipment. After cooling to ambient temperatures, the granules remain somewhat soft. However, after about 12 to about 16 hours of pile curing at ambient temperature the granules harden. During curing there may be some slight adherence of granules. If desired, the tacky surface condition and subsequent adherence of granules can be reduced or eliminated by introducing ammonia to the tacky granules at elevated temperature or at ambient temperature, following the granulating step 16. Alternatively, the surface may be coated with a clay such as bentonite to eliminate the tackiness. In yet another alternative, a secondary ingredient such as a micro nutrient in finely divided form, ferro-sulfate being an example, may be coated onto the tacky surface of the granule and is retained at the surface of the final hardened granule. The optional additions may be made in a separate step, such as in a cooling apparatus 18. The cooling apparatus 18 is preferably an ambient-temperature continuous feed drum, and the optional additions may be made by spraying or blowing the additions onto the granules, or by maintaining an atmosphere such as ammonia in the apparatus 18. The secondary ingredient may also be added to the final hardened product by warming the granules back into the thermoplastic range to create a tacky surface and then applying the secondary ingredient.

Even though the final granulated ammonium sulfate product has a relatively uniform granule size, for product intended for some applications any oversize or undersize particles must be removed in a sizing apparatus 20 such as a series of screens. The properly sized granules are then packaged, and improperly sized particles are removed to a grinding mill 22, wherein the particles are reduced to fine sizes for subsequent recycling and reintroduction into the coating apparatus 14.

While the presently preferred embodiment has been described in relation to granulation of ammonium sulfate, those skilled in the art will recognize that the process of the present invention has applicability in the granulation of other salts, macro nutrients and micro nutrients, which do not themselves naturally experience a proper thermoplastic temperature range to promote granulation. The following fertilizer materials are exemplary of the materials to which the process of the invention is applicable, without limiting the invention to these materials: potassium sulfate, gypsum, lime and limestone, iron salts such as sulfates, magnesium sulfate and carbonates, sulfur, various metal chelates, and combinations of these and other materials. Although these or other materials may exhibit some degree of thermoplasticity, in general their thermoplasticity is insufficient to allow their granulation processing in the absence of an aid. Consequently, such materials are termed herein "non-thermoplastic", even though they may exhibit some minor thermoplasticity.

The present invention is also applicable to preparing granules of a mixture of such materials, or even granules of a mixture of a non-thermoplastic material with a thermoplastic material. In preparing mixtures, two feed streams of fine particles are fed to coating and granulating apparatus, wherein granules incorporating proportions of both components are formed. By this approach, custom fertilizers may be produced.

Through the use of the present invention, relatively uniformly sized granules including non-thermoplastic materials such as salts, macro nutrients, and micro nutrients may be prepared from fine particles, by coating the fine particles with urea phosphate and then granulating the coated particles. The process permits variations in the processing parameters while still obtaining the desirable final granular product. Further, the size of the final granules may be controlled by varying the ratio of urea phosphate to fertilizer. Although a particular embodiment of the invention has been described in detail for purposes of illustration, various modifications may be made without departing from the spirit and scope of the invention. Accordingly, the invention is not to be limited except as by the appended claims.

What is claimed is:

1. A process for preparing a granulated product from fine particles of a non-thermoplastic material, comprising the steps of:
providing a liquid solution of urea phosphate;
providing the non-thermoplastic material as finely divided solid particles;
coating the particles with urea phosphate;
granulating the coated particles at a temperature within the thermoplastic range of the urea phosphate, to adhere the finely divided particles together into granules.

2. The process of claim 1, including the further step of:
adding ammonia gas to the granules, after said step of granulating, to harden the granules.

3. The process of claim 1, including the further step of:
adding a clay to the granules, after said step of granulating, to reduce surface tackiness of the granules.

4. The process of claim 1, including the further step of:
adding a micro nutrient to the granules, after said step of granulating.

5. The process of claim 1, including the further step of:
sizing the granules, after said step of granulating.

6. The process of claim 1, wherein the urea phosphate solution is prepared by mixing urea into phosphoric acid at a temperature of from about 100° F. to about 160° F.

7. The process of claim 1, wherein the amount of urea phosphate solution used in said coating step is from about 12 percent to about 15 percent by weight of the amount of the non-thermoplastic material.

8. The process of claim 1, wherein said step of granulating is performed at a temperature of from about 100° F. to about 190° F.

9. The process of claim 1, wherein said step of granulating is performed at a temperature of about 120° F.

10. The process of claim 1, wherein the granulated product is a fertilizer.

11. The process of claim 1, wherein the non-thermoplastic material is ammonium sulfate.

12. The process of claim 1, wherein the non-thermoplastic material is chosen from the group consisting of: potassium sulfate, gypsum, lime, limestone, iron sulfate, magnesium sulfate, magnesium carbonate, sulfur, and combinations thereof.

13. A process for preparing granulated ammonium sulfate, comprising the steps of:
preparing a urea phosphate solution by mixing solid urea with wet process phosphoric acid;
providing ammonium sulfate as finely divided solid particles;
coating the urea phosphate solution onto the ammonium sulfate particles;
granulating the coated ammonium sulfate particles at a temperature of about 120° F. to produce granules having a tacky surface;
adding an ingredient to the granules to reduce the tackiness of their surface; and
sizing the granules.

14. A process for preparing granules containing a mixture of a non-thermoplastic first solid material, and a second solid material, comprising the steps of:
providing a liquid solution of urea phosphate;
providing the first and second materials as finely divided particles;
coating the particles of the first material with urea phosphate;
combining a first proportion of the coated first material and a second proportion of the second material in a granulating apparatus, said combining to occur within the thermoplastic range of the urea phosphate to cause the first and second materials to adhere together into granules.

* * * * *